United States Patent [19]

Eidsmore

[11] Patent Number: 4,694,860

[45] Date of Patent: Sep. 22, 1987

[54] FLUID-FLOW ISOLATION AND CONTROL APPARATUS AND METHOD

[76] Inventor: Paul G. Eidsmore, 2 Blue Hill Ct., Scotts Valley, Calif. 95066

[21] Appl. No.: 826,022

[22] Filed: Feb. 4, 1986

Related U.S. Application Data

[63] Continuation-in-part of Ser. No. 675,825, Nov. 28, 1984, Pat. No. 4,624,443, which is a continuation-in-part of Ser. No. 398,845, Jul. 16, 1982, abandoned.

[51] Int. Cl.⁴ .............................................. F16K 31/08
[52] U.S. Cl. .................. 137/614.21; 251/65; 251/76
[58] Field of Search .............. 137/614.21, 614.19; 251/65, 76

[56] References Cited

U.S. PATENT DOCUMENTS

| | | | |
|---|---|---|---|
| 2,104,640 | 1/1938 | Goudolf | 137/614.21 |
| 2,344,354 | 3/1944 | Hallenstrom | 137/614.21 |
| 3,212,751 | 10/1965 | Hassa | 251/65 |
| 3,361,161 | 1/1968 | Schwartz | 251/65 X |
| 3,877,478 | 4/1975 | Longworth | 137/94 |

*Primary Examiner*—Harold W. Weakley
*Attorney, Agent, or Firm*—Fay, Sharpe, Beall, Fagan, Minnich & McKee

[57] ABSTRACT

Fluid-flow control apparatus and method are disclosed by which magnetically-positionable elements within a rigid body can be externally manipulated using a controlling source of magnetic flux. The relative attractive forces which bias internal magnetic elements into normally-closed sealing engagement are substantially altered by repositioning the magnetic elements in response to the controlling magnet flux. Complete sealing or isolation against back flow through the valve under conditions of net positive outlet pressure is inhibited by the internal double-acting sealing elements which respond in unified manner to the controlling magnetic flux.

16 Claims, 6 Drawing Figures

4,694,860

FLUID-FLOW ISOLATION AND CONTROL APPARATUS AND METHOD

CROSS-REFERENCE TO RELATED APPLICATION

This application is a continuation-in-part application of pending application Ser. No. 675,825 filed Nov. 28, 1984, now U.S. Pat. No. 4,624,443, entitled FLUID-FLOW CONTROL VALVE AND METHOD, which is a continuation-in-part application of application Ser. No. 398,845 filed July 16, 1982, and entitled FLOW LIMIT VALVE now abandoned.

BACKGROUND OF THE INVENTION

Fluid under pressure is commonly controlled by means of a valve that includes a valve seat and a mating element that can be controllably positioned relative to the valve seat. However, the position of the mating element relative to the valve seat within the valve is typically controlled from outside the valve with the aid of sliding or rotating seals surrounding some portion of the movable element that protrudes through the valve.

Valves for controlling toxic fluids under pressure are known to obviate sliding or rotating seals by relying upon magnetic fields externally applied to control the operation of internal valve parts. Magnetically-actuated valves of various types are disclosed in the literature (see, for example, U.S. Pat. Nos. 3,783,887; 4,331,171; 4,382,449; 4,114,852; 1,132,570; 3,877,478; 3,774,878; 3,212,751; 4,506,701; 4,350,182; 4,349,042; 4,018,419 cited in the aforementioned related application).

SUMMARY OF THE INVENTION

In accordance with the preferred embodiments of the present invention, single-acting and double-acting valve elements may be magnetically controlled from a location that is external to the valve body to provide fluid flow control and fluid system isolation without the potential hazard of sliding or rotating seals between the fluid system and the environment. The valving apparatus and method according to the present invention thus permit convenient control of fluids under pressure simply by manipulating the strength and orientation of an external magnetic field applied to internal magnetically-responsive valve elements. Single-acting valve operation according to one embodiment of the present invention may serve as a pressure-enhanced, normally-closed valve that can be magnetically activated to pass fluid in the downstream direction from the fluid supply. A double-acting valve according to another embodiment of the present invention may serve as a pressure-enhanced isolation valve which prevents fluid flow in both directions, for example, under conditions of excess back pressure, until magnetically activated by an external, controlling magnetic field.

DESCRIPTION OF THE PREFERRED EMBODIMENT

Figure 1:
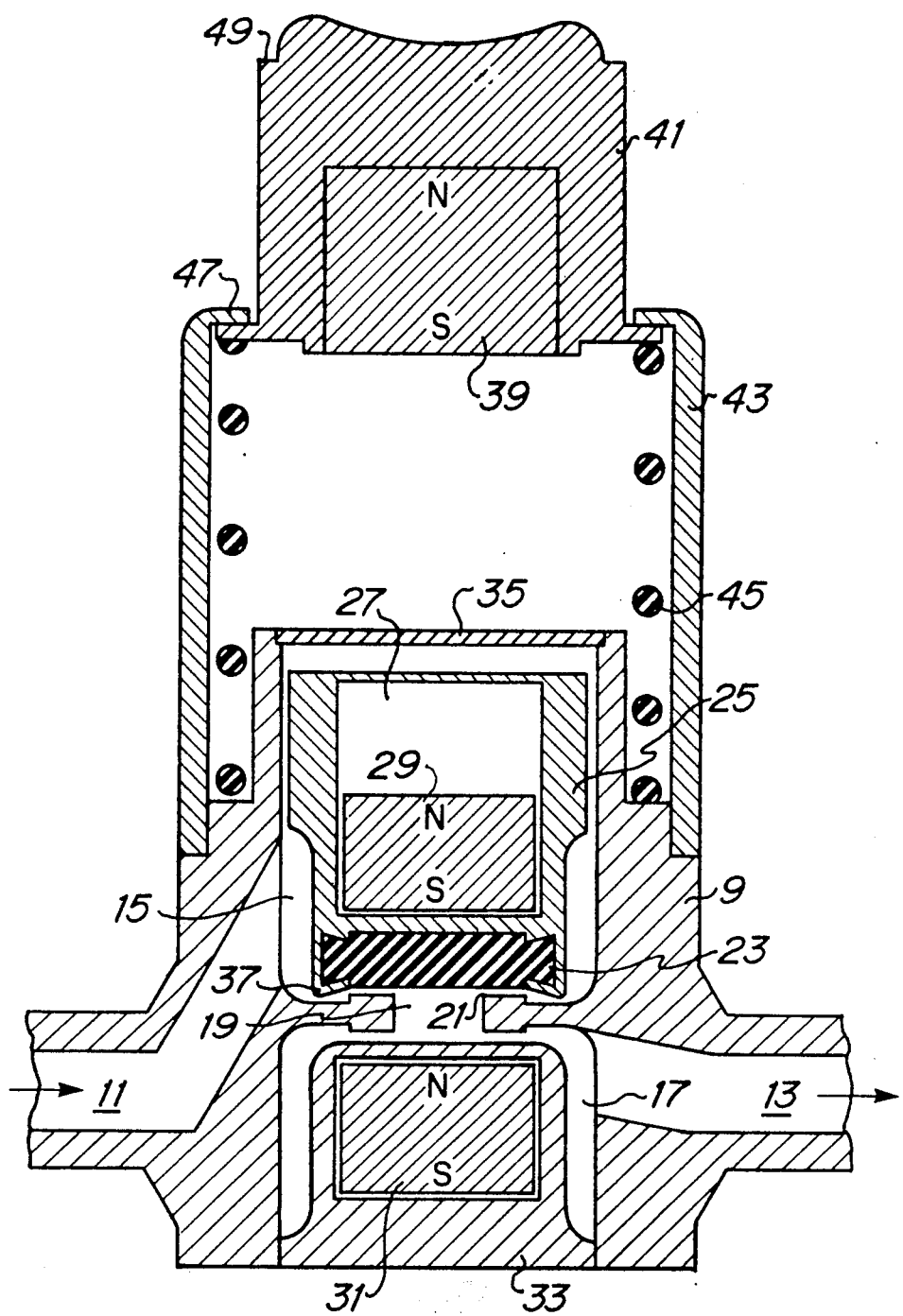
FIG. 1 is a pictorial sectional view of a generally cylindrically-shaped valve according to one embodiment of the present invention, operating in normally closed condition.

Referring now to FIG. 1, there is shown a cross-sectional view of a generally cylindrical valve in metal body 9 that includes integral fluid ports 11 and 13. Alternatively, the fluid ports 11 and 13 may be welded to body 9 using electron-beam welding techniques, or the like, to eliminate threads, flanges and other discontinuities and the associated probabilities for leaks. Each of the fluid ports 11 and 13 is coupled to an internal channel 15, 17, respectively, which are coupled to each other through aperture 19. Fluid flow through the valve is controlled by the spacing or engagement between the sealing surface 21 surrounding aperture 19 and an elastomeric valve seal 23 that is carried on movable element 25. The element 25 is generally cylindrical and is mounted for sliding movement within the fluid channel 15 in a direction that carries the valve seal 23 into or away from sealing engagement with the sealing surface 21 of the aperture 19. The element 25 includes a sealed internal, elongated cylindrical chamber 27 which contains a generally cylindrically-shaped magnet 29 that is free to slide from one end to the other within chamber 27.

Another magnet 31 may be encapsulated within the end cap 33 that is disposed in the fluid channel 17. The magnet 31 is positioned near the aperture 19 in close proximity and in attraction orientation to the magnet 29. The end cap 33 may be sealed to the lower end of body 9 and an end plate 35 may be sealed to upper end of body 9 using electron-beam welding techniques, or the like, to avoid joints that may leak. Thus, the valve body 9 and associated elements 11, 13, 33 and 35 may all be formed of stainless steel, aluminum, plastic, or other suitable non-magnetic material that may also be beam welded or otherwise sealed against leaks.

The valve embodiment illustrated in FIG. 1 operates in normally-closed mode due to the magnetic attraction between magnetics 29 and 31 that carries the elastomeric seal 23 or element 25 into sealing engagement with the sealing surface 21 of body 9 that surrounds the aperture 19. The seal 23 may be formed as a wafer of perfluoroelastomer (available commercially as Kalrez, from Du Pont Co.), or other suitable chemically inert material, and may be molded or encapsulated on the end of element 25 by cold-rolling a flange 37 inwardly upon the wafer 23, as shown. With fluid applied under pressure to channel 15 via fluid port 11, the fluid seal formed by and between seal 23 and surface 21 is enhanced by the pressure differential between channels 15 and 17 acting on the cross sectional area of aperture 19. This pressure-enhanced sealing force and the magnetic-attractive sealing force must be overcome in order to open the valve to permit fluid flow therethrough.

Figure 2:
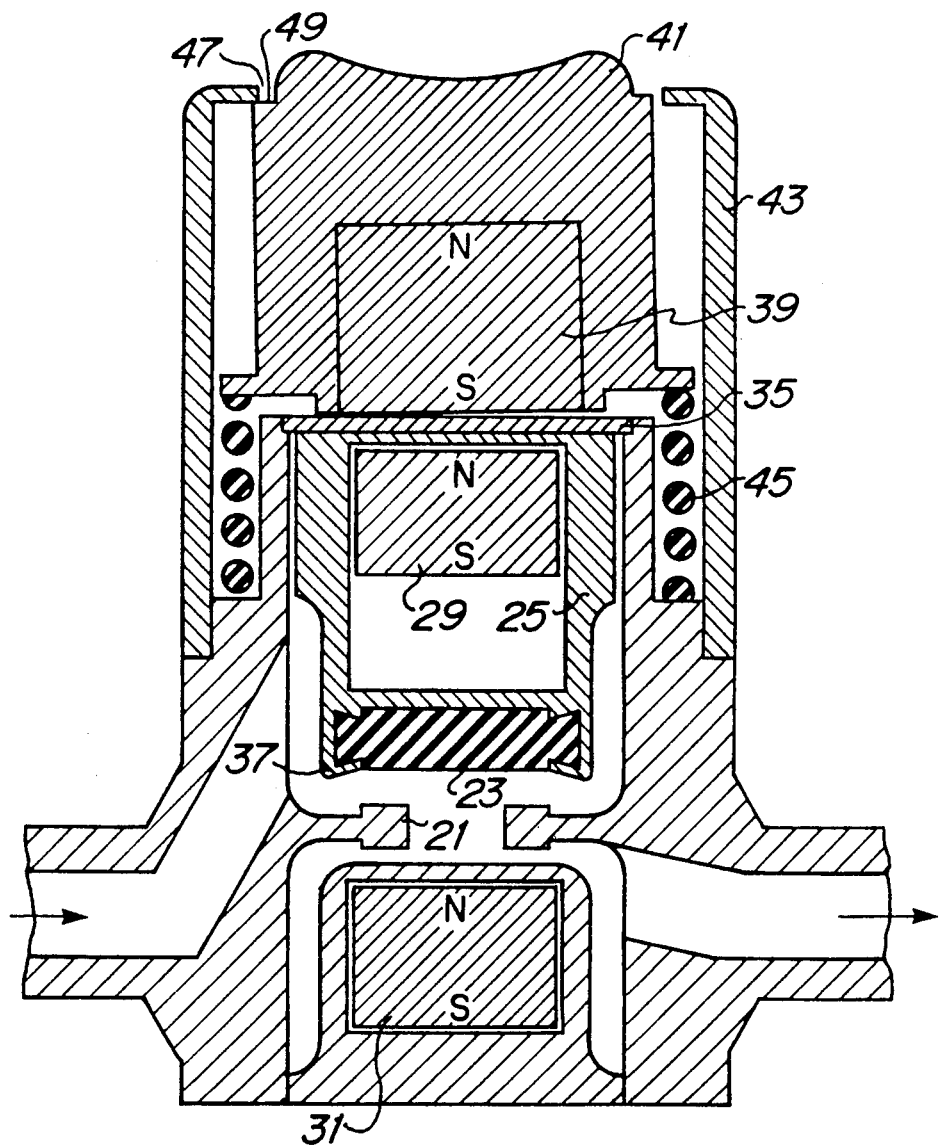
FIG. 2 is a pictorial sectional view of the embodiment of FIG. 1, shown operating in the actuated or open mode to pass fluid under pressure.

Referring now to FIG. 2, there is shown the valve embodiment of FIG. 1 operating in the open position under control of an external magnetic actuator 39. This magnet 39 provides the controlling magnetic flux and is encapsulated within a manually-depressable push button 41. The push button 41 is captivated on the outside of valve body 9 by the cylindrical guide 43 and is spring-biased 45 to the distal or inactive position illustrated in FIG. 1. Magnet 39 is shown as being generally larger than the magnet 29, but it should be understood that the magnetic flux from magnet 39 should be sufficient to attract magnet 29 away from its lower position within chamber 27 in close proximity to magnet 31 (thus sealing the aperture 19) to its upper position within chamber 27 in close proximity to magnet 39. In this upper position, the element 25 with seal 23 is moved upwardly and away from sealing surface 21 to open the aperture 19 for fluid flow therethrough. Also, with magnet 29 in this upper position, its attraction to magnet 31 is substantially reduced so that magnet 39 maintains control over valve operation for as long as it is positioned close to end plate 35. The push button 41 that carries magnet 39 may be 'latched' in this control position by the inward flange 47 of the guide 43 engaged with shoulder 49 near the top of the button 41. Of course, it should be understood that means other than magnet 39 in push button 41 may be used to control the valve. For example, an electromagnet may be attached to the valve body in known manner to selectively establish the requisite attractive magnetic field under electrical control. Similarly, an air-operated plunger may be attached to the valve body 9 and to the magnet 39 in known manner to selectively position the magnet 39 close to end plate 35 under pneumatic control. Thus, fluid flow through this embodiment of the valve of the present invention is controlled externally by magnetically attracting the relatively-movable sealing elements into sealing engagement, and by repositioning a movable magnet carried by a sealing element away from its one position of sealing engagement (by its closely-spaced attraction to a biasing magnet) to another position that is closely adjacent an attractive, controlling magnet and that is substantially spaced from the biasing magnet.

Figure 3:
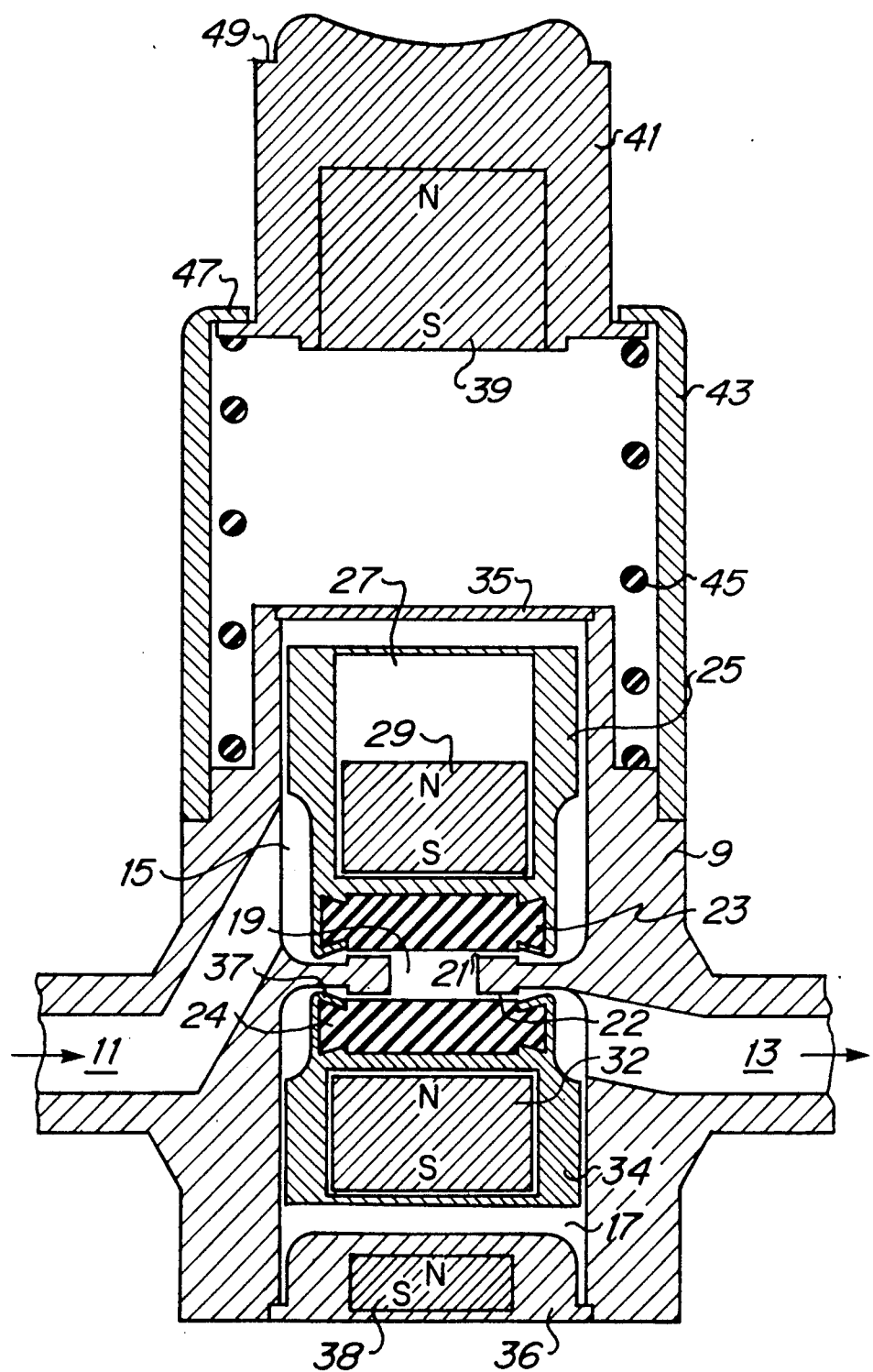
FIG. 3 is a pictorial sectional view of another embodiment of the present invention similar to the embodiment of FIG. 1 which provides seals against bidirectional fluid flow in normally closed operation.

In certain fluid-flow controlling applications of the present invention, it is important to ensure that back pressure on the outlet side of the valve cannot overcome the magnetically-enhanced, pressure-enhanced seal and force fluid back through the valve. In such applications, it is advantageous to seal both inlet and outlet sides of the valve aperture 19 according to another embodiment of the present invention, as illustrated in FIG. 3. In that figure, the elements which are similar to elements illustrated in FIG. 1 bear the same legends. It should be noted that, in the illustrated embodiment of FIG. 3, a magnet 32 (for attracting the magnet 29 carried in element 25 into sealing engagement) is itself encapsulated in a movable sealing element 34 which includes an elastomeric seal 24. Thus, with the magnets 29 and 32 disposed in attractive orientation and carried by their respective sealing elements 25 and 34, the aperture 19 sealed from both sides by seal 23 engaging the surrounding upper surface 21 and by seal 24 engaging the surrounding lower surface 22. These magnetically-enhanced seals are enhanced further by net fluid pressure in channel 15 (which enhances seal 21, 23) or by net fluid pressure in channel 17 (which enhances seal 22, 24), thereby assuring complete isolation between the fluid ports and channels that couple to aperture 19. Another magnet 38 (shown smaller to depict a source of relatively lower-level magnetic flux) is encapsulated within the end cap 36 in attractive orientation to magnet 32, and the end cap 36 is beam welded to body 9, as discussed previously, to eliminate joints and the possibility of leaks. The magnet 38 of lower-level flux is thus incapable of overcoming the attractive force between magnets 29 and 32 that bias the seals closed, and the valve operates normally closed, as described above.

Figure 4:
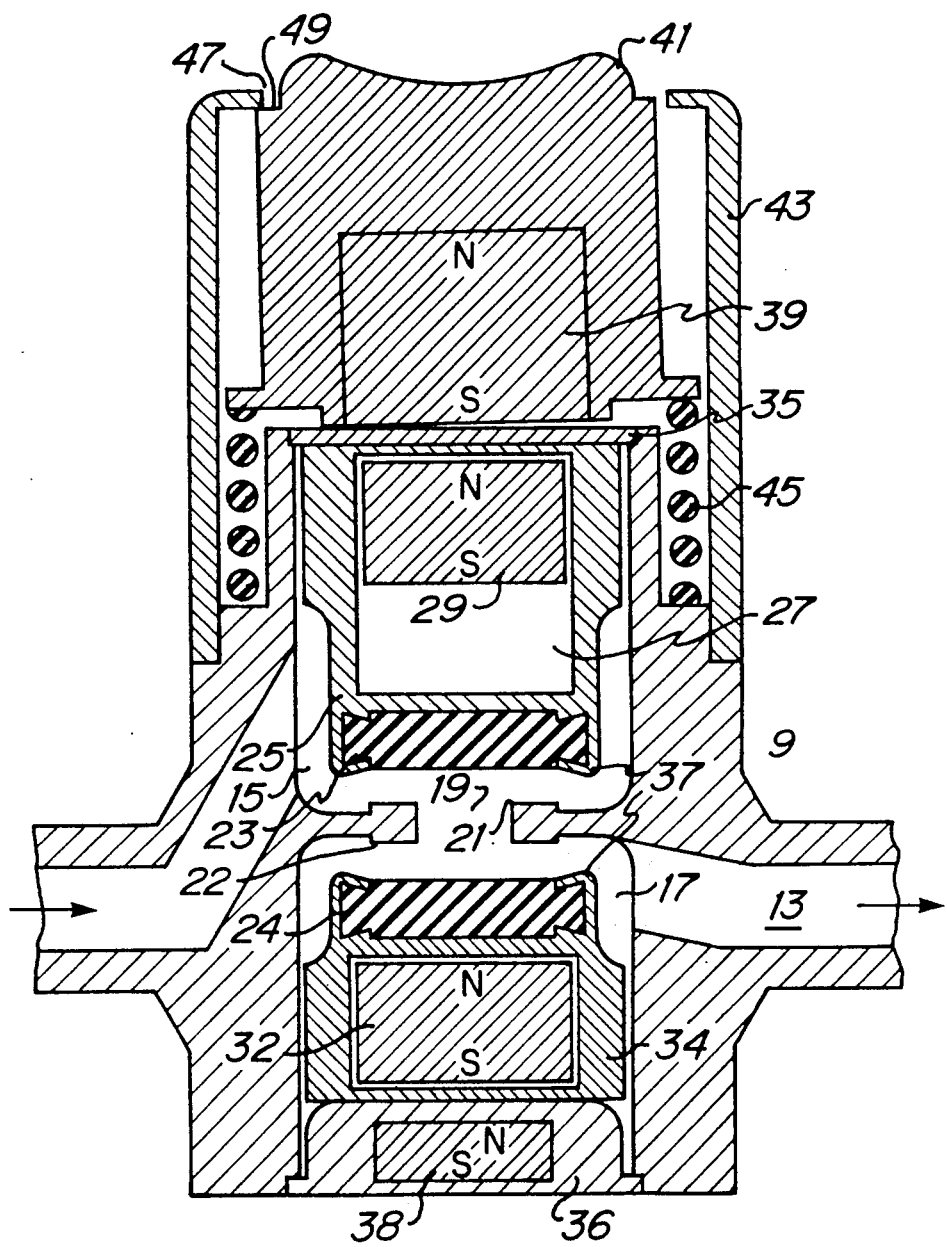
FIG. 4 is a pictorial sectional view of the embodiment of FIG. 3 shown operating in the actuated or open mode to pass fluid under pressure.

Referring now to FIG. 4, there is shown the valve embodiment of FIG. 3 actuated to open the aperture 19 according to the present invention. Specifically, the magnet attraction between magnets 29 and 39 (when magnet 39 is repositioned, upon actuation of button 41, into close proximity with the end plate 35), repositions the magnet 29 to the upper position within chamber 27 and carries element 25 and seal 21 away from engagement with sealing surface 21. This repositioning of magnet 29 away from magnet 32 substantially reduces the attractive force therebetween, and magnet 32 is attracted with greater net force toward magnet 38. Element 34 which carries the magnet 32 and seal 24 is thus slidably repositioned away from sealing engagement between seal 24 and surface 22, and in close proximity to magnet 38.

The valve continues to operate in the open mode, as illustrated, under the control of magnetic flux from magnet 39. Once magnet 39 is repositioned remotely from end plate 35 (or the magnetic flux of an equivalent electromagnet is decreased), the net attractive force between magnets 29 and 32 is again restored, the magnet 29 is repositioned within chamber 27 closely adjacent the aperture, and the respective elements 25, 34 and seals 23, 24 are repositioned against both sealing surfaces 21, 22 of aperture 19. The attractive force between magnets 38 and 32 is reduced and is overcome by the attractive force between magnets 29 and 32 to restore the valve to normally-closed operation, as illustrated in FIG. 3. Thus, fluid flow through this embodiment of the valve of the present invention is further controlled by repositioning movable, attractive magnets carried by movable sealing elements disposed on each side of an aperture away from their respective positions of sealing engagement with the aperture, to other positions of their respective sealing elements away from sealing engagements with the aperture and closely proximate other respective attracting magnets.

Figure 5A:
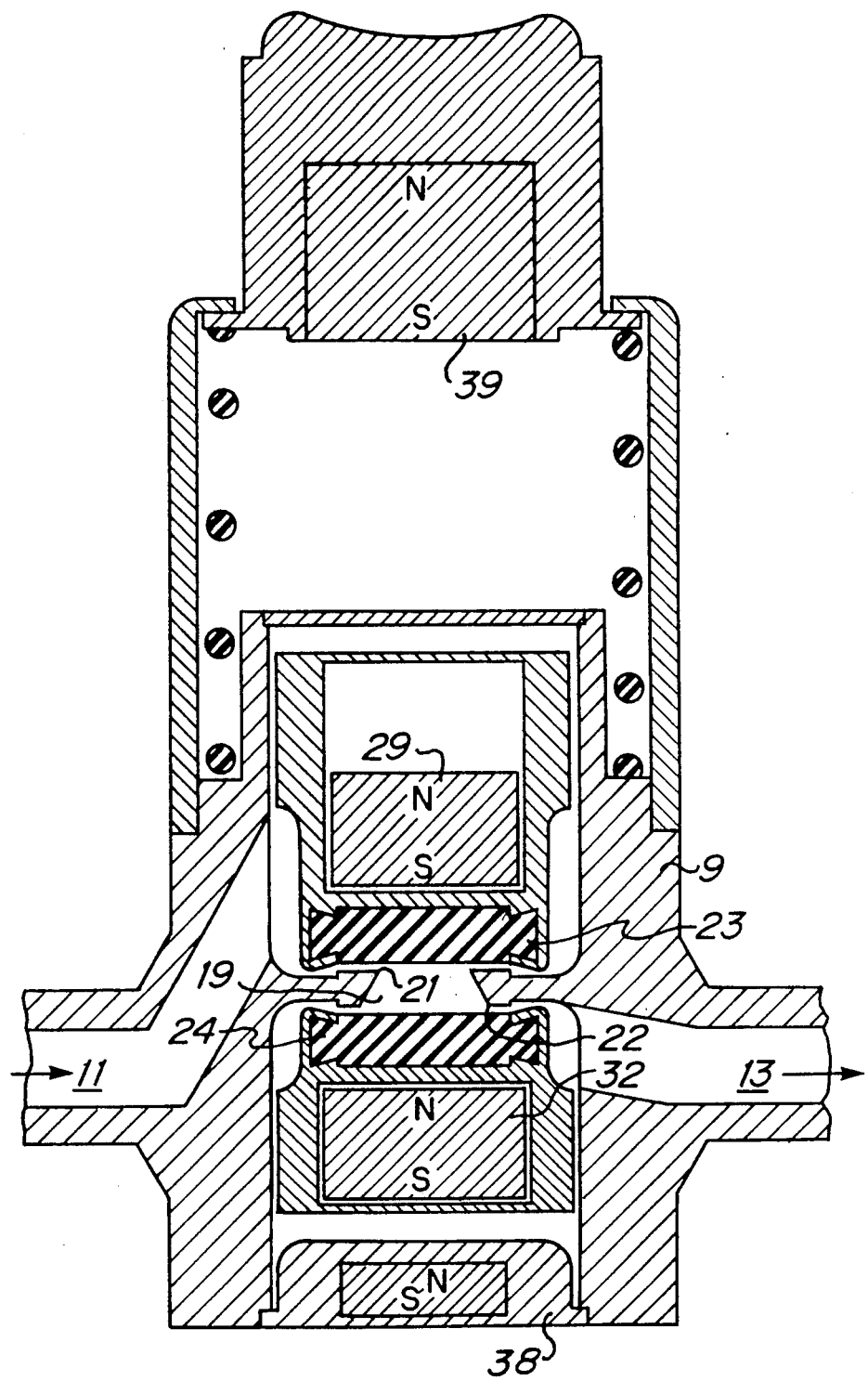
FIGS. 5a and 5b are pictorial sectional views of an embodiment of the valve of FIG. 3 in which the walls of the aperture are tapered to establish different limits of fluid pressure against which the valve may be opened.
Figure 5B:
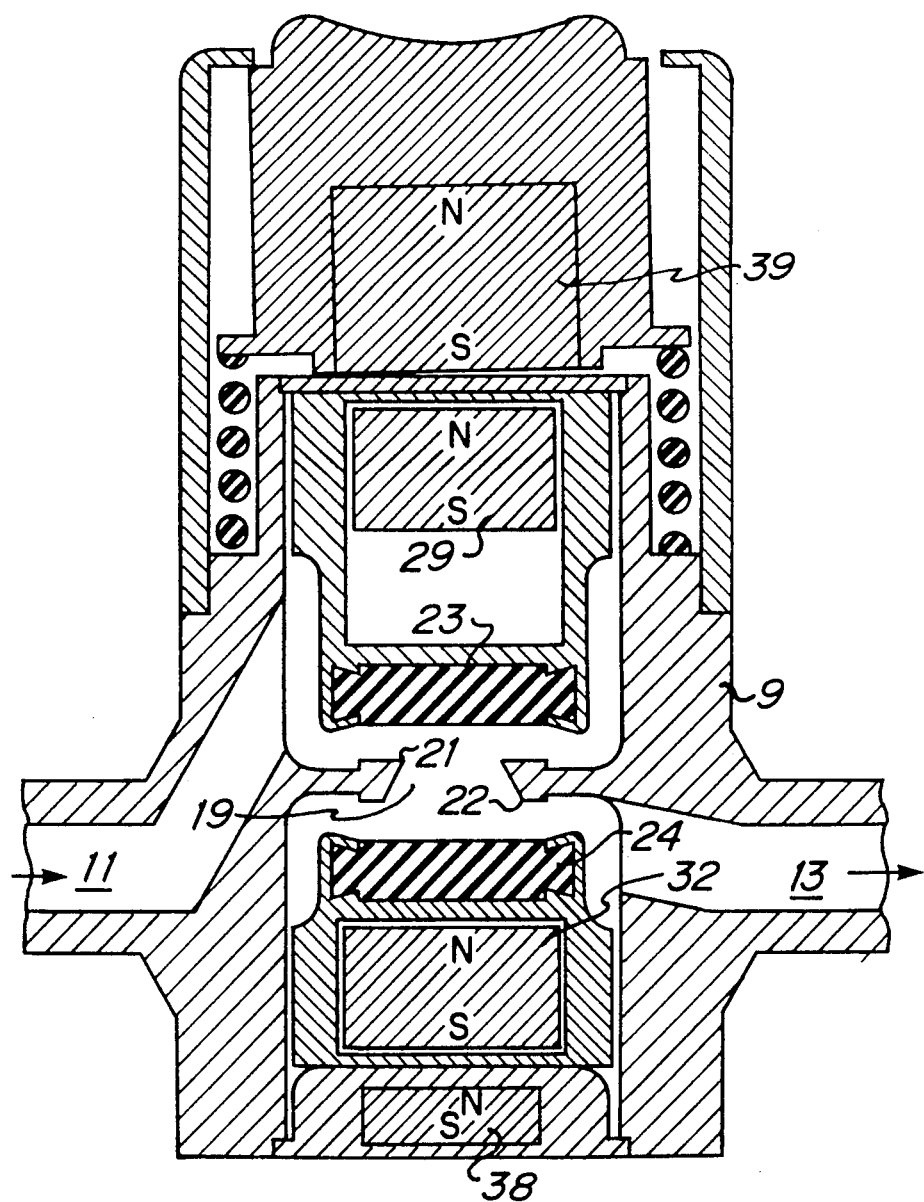

It should be noted that the valve of the present invention assures a margin of safety against opening under conditions of overpressurization of the fluid supply. The pressure-enhanced seal against fluid flow, as previously described, and the limited magnetic force that is available internally to actuate the elements 25 and 34 establish a maximum pressure above which the valve cannot be opened. This is particularly important if the valve is placed in a system upstream of a glass or quartz vessel (as is common in semiconductor manufacturing systems) which may rupture or be damaged by excessive fluid pressure. Thus, in contrast to conventional valves which may be forced open under manual control, or by sufficient air pressure or electromagnetic force applied to the valve, operation of the present valve in overpressure supply conditions remains immune to externally-applied forces that might be imprudently applied to force it open. Pushing down harder upon the button 49 does not apply more force to open the valve than can be provided by the magnetic attraction of magnets 29 and 39. The force available from these magnets can thus only overcome a certain limited supply of fluid pressure acting upon the effective area of the aperture. For a larger aperture and the same magnets 29 and 39, only a lower level of supply pressure can be overcome to open the valve. Referring, therefore, to FIGS. 5a and 5b, there is shown a sectional view of another embodiment of the valve of FIGS. 3 and 4 in which the walls of the aperture 19 are tapered so that the valve-seat surfaces 21 and 22 provide different areas over which the inlet pressure and outlet pressure, or back pressure, operate. In accordance with this feature of the present invention, the valve may be designed to open on the inlet side against a relatively high supply pressure while the outlet side may only be opened against the outlet or back pressure of lower level.

Therefore, the fluid flow isolation and control apparatus and method according to the present invention provides reliable normally closed operation which can be controlled externally by magnetic means without need for sliding seals or bellows between internal fluid channels and the environment. In addition, the integrity against back flow through the valve can be preserved according to the present invention by providing double-acting sealing elements on both sides of an aperture under the unified control of a single source of magnetic flux.

What is claimed is:

1. Apparatus for controlling the flow of fluid under pressure, comprising:
    a body having first and second fluid channels therein and an aperture communicating between the first and second fluid channels;
    an element mounted within the first fluid channel for selective movement into and away from engagement with the aperture for selectively forming a fluid-tight seal therewith, said element including an elongated chamber having a first dimension therewithin substantially aligned with the direction of movement of the element;
    a first magnet having a second dimension substantially less than said chamber first dimension, said first magnet being slidably disposed in said chamber for movement between a first position adjacent the aperture and a second position remote from said aperture;
    a second magnet positioned within the second fluid channel to magnetically urge the first magnet into said first position and to urge the element into engagement with said aperture; and,
    magnet means disposed external to the first and second fluid channels for selectively magnetically actuating said first magnet to slide within said chamber to said second position and urge the element away from engagement with said aperture.

2. Apparatus as in claim 1 wherein said magnet means includes a third magnet disposed external to said first and second channels to be positioned selectively adjacent said element and remotely from said element and attractively oriented relative to said first magnet, said third magnet having magnetic flux strength to attract said first magnet into said second position and said element away from sealing engagement with said aperture when said third magnet is positioned adjacent said element.

3. Apparatus as in claim 1 wherein:
    said second magnet is carried by an auxiliary element having sealing means thereon and which is disposed within said second fluid channel for selective movement into and away from sealing engagement with said aperture for selectively forming a fluid-tight seal therewith, said second magnet and auxiliary element being urged away from sealing engagement with the aperture, and said second magnet and said first magnet in said first position having sufficient magnetically attractive force to retain each of said element and said auxiliary element in fluid-tight sealing engagement with said aperture.

4. Apparatus as in claim 3 comprising:
    a fourth magnet disposed near the second magnet for magnetically urging the second magnet and the auxiliary element carrying the second magnet in a direction away from engagement of the auxiliary element with said aperture, said fourth magnet having sufficient magnetically attractive force to urge the auxiliary element and the second magnet carried thereby away from sealing engagement of the auxiliary element with the aperture while said first magnet is in said second position, and insufficient magnetically attractive force to overcome the attractive force between the first and second magnets with said first magnet in said first position.

5. Apparatus as in claim 3 wherein said aperture tapers outwardly toward said second fluid channel to establish larger cross sectional area thereof in the second fluid channel than in the first fluid channel.

6. Apparatus as in claim 3 wherein said aperture tapers between first and second fluid channels to establish larger cross-sectional area in one of said fluid channels than in the other of said fluid channels to establish different fluid pressures required to overcome the fluid seal at each such aperture in response to a sealing force applied to the respective element or auxiliary element.

7. Apparatus for controlling the flow of fluid under pressure, comprising:
    a body having a first fluid channel and a second fluid channel therein and an aperture communicating therebetween;
    an element slidably disposed within one of said channels for selective movement into and away from sealing engagement with the aperture, said element having a first magnet associated therewith;
    means for mounting said first magnet in said element for selective movement relative thereto;
    means for enclosing the element within said channel; and,
    magnet means disposed outside the body in magnetically interactive relationship with said first magnet for selectively altering the position of said element in said one channel relative to said aperture for controlling flow of fluid therethrough between the fluid channels.

8. Apparatus as in claim 7 wherein said element enclosing means includes a plate welded to the body to permanently seal the body against fluid leaks, said element within the body being selectively controlled solely by the magnet means disposed outside the body without a sliding seal or flexible member interposed to contain fluid under pressure within the body.

9. Apparatus as in claim 7 comprising a first fluid port communicating with the first fluid channel and a second fluid port communicating with the second fluid channel, said first and second fluid ports being permanently and rigidly welded to the body.

10. Apparatus as in claim 7 comprising fluid port means communicating with the first fluid channel for supplying fluid under pressure thereto and for pressure-enhancing the sealing engagement of the element with said aperture that has a selected cross sectional area;

said magnet means establishing a maximum of magnetically-interactive force with said first magnet to overcome the pressure-enhanced sealing engagement of the element with said aperture only to a selected limit of fluid pressure differential across the aperture acting upon the selected cross sectional area thereof.

11. The apparatus as defined in claim 7 wherein said means for mounting said first magnet includes a chamber having a first longitudinal dimension substantially larger than a longitudinal axial length of said first magnet.

12. An apparatus for controlling the flow of fluid under pressure comprising:
   a body having first and second channels interconnected by an aperture disposed therebetween;
   a first element received in said first channel for selective movement toward sealing engagement with said aperture;
   a first magnet means operatively associated with said first element for moving said first element between open and closed positions opening and closing fluid flow through said first channel;
   a second element received in said second channel for selective movement toward sealing engagement with said aperture;
   a second magnet means operatively associated with said second element for moving said second element between open and closed positions in said second channel, said first and second magnet means interacting with one another in one of said open and closed positions;
   a third magnet means for actuating movement of said first element to the other of said open and closed positions through selective magnetic interaction with said first magnet means, said third magnet means having a flux force greater than said second magnet means; and,
   a fourth magnet means operatively associated with said second element for retaining said second element in the other of said open and closed positions when said third magnet means interacts with said first magnet means, said fourth magnet means having a flux force less than said first magnet means such that said second magnet means interacts with said first magnet means when said third magnet means does not interact with said first magnet means.

13. The apparatus as defined in claim 12 further comprising means for mounting said first magnet means to said first element for selective movement relative thereto.

14. The apparatus as defined in claim 13 wherein said mounting means includes a chamber defined in said first element having a first longitudinal dimension substantially greater than a second longitudinal dimension of said first magnet means.

15. The apparatus as defined in claim 12 further comprising means for biasing said third magnet means to a non-interactive position with respect to said first magnet means.

16. The apparatus as defined in claim 12 further comprising means for selectively locking said third magnet means in an interactive position with respect to said first magnet means.

* * * * *